United States Patent [19]
Suzuki et al.

[11] Patent Number: 5,365,290
[45] Date of Patent: Nov. 15, 1994

[54] CAMERA CAPABLE OF RECORDING PHOTOGRAPHING INFORMATION AND PRINTING APPARATUS THEREFOR

[75] Inventors: Tatsuya Suzuki; Masaki Nagao; Kunio Yokoyama, all of Tokyo, Japan

[73] Assignee: Olympus Optical Co., Ltd., Tokyo, Japan

[21] Appl. No.: 104,186

[22] Filed: Aug. 9, 1993

[30] Foreign Application Priority Data

Aug. 10, 1992 [JP] Japan .................................. 4-212970
Aug. 24, 1992 [JP] Japan .................................. 4-224115

[51] Int. Cl.$^5$ ............................................ G03B 17/08
[52] U.S. Cl. ........................................ 354/64; 354/106; 354/76
[58] Field of Search .......................... 354/64, 65-74, 354/76, 105, 106

[56] References Cited

U.S. PATENT DOCUMENTS

| | | | |
|---|---|---|---|
| 3,976,937 | 8/1976 | Hearn | 354/70 |
| 4,643,549 | 2/1987 | Nagata et al. | 354/64 |
| 5,086,314 | 2/1992 | Aoki et al. | 354/412 |

FOREIGN PATENT DOCUMENTS

| | | |
|---|---|---|
| 4-70725 | 3/1992 | Japan . |
| 4-70726 | 3/1992 | Japan . |
| 4-268541 | 9/1992 | Japan . |

*Primary Examiner*—David M. Gray
*Attorney, Agent, or Firm*—Louis Weinstein

[57] ABSTRACT

A camera capable of recording photographic information, according to the invention, comprises, a pressure-information detector for detecting pressure information at a location where a camera body is positioned, a magnetic recorder for recording the information detected by the pressure-information detector onto a magnetic memory section provided on a film, as environmental information, and a recording controller for controlling the photographic-information recorder such that the detected information and a photographic image are recorded correspondingly to each other.

25 Claims, 8 Drawing Sheets

CAMERA CAPABLE OF RECORDING PHOTOGRAPHING INFORMATION AND PRINTING APPARATUS THEREFOR

BACKGROUND OF THE INVENTION

1. Field of the Invention

The present invention relates to cameras capable of recording photographic information and printing apparatuses therefor, and more particularly, to a camera capable of recording photographic information, which and are capable of recording environmental data upon photographing onto a film which has a magnetic information memory section, and a printing apparatus therefor.

2. Related Art And Prior Art Statement

Many cameras capable of recording environmental information or the like upon photographing have conventionally been proposed. For example, a camera for recording a photographed image, capable of recording temperature information is disclosed in Japanese Patent Laid-Open No. HEI 4-70725 (70725/1992), which is characterized by comprising a temperature sensor, recording means for recording temperature data which have been obtained from the temperature sensor, and recording control means for recording the temperature data to the recording means in correspondence to the photographed image.

Further, a camera for recording a photographed image, capable of recording humidity information is disclosed in Japanese Patent Laid-Open No. HEI 4-70726 (70726/1992), which is characterized by comprising a humidity sensor, recording means for recording humidity data obtained from the humidity sensor, and recording control means for recording the humidity data to the recording means correspondingly to the photographed image.

Meanwhile, in recent years, a film (a film having a magnetic information memory section) having a magnetic information memory section on a photographic film has been proposed, and technical means has also been proposed for recording environmental data relating to the aforesaid photographing onto the magnetic information memory section.

By the way, in the technical means which has been proposed in Japanese Patent Laid-Open No. HEI 4-70725 and Japanese Patent Laid-Open No. HEI 4-70726, means for recording the humidity information or the temperature information has been proposed. However, the memory means is not one which records data relating to atmospheric pressure or altitude or height, onto a film having a magnetic information memory section. Moreover, of cameras capable of photographing in water, a camera capable of recording water-pressure information or water-depth information has not yet been proposed.

OBJECTS AND SUMMARY OF THE INVENTION

It is a first object of the invention to provide a camera capable of recording photographic information, which is capable of recording atmospheric pressure at a photographed location, onto a film.

It is a second object of the invention to provide a camera capable of recording photographic information, which is capable of recording altitude at a photographed location, onto a film.

It is a third object of the invention to provide a camera capable of recording photographic information, which is capable of photographing within water and which is capable of recording water pressure at a photographed location, onto a film.

It is a fourth object of the invention to provide a camera capable of recording photographic information, which is capable of photographing within water and which is capable of recording depth of water at a photographed location, onto a film.

It is a fifth object of the invention to provide a camera system comprising a camera capable of recording photographed information, which is capable of recognizing, at a glance, atmospheric pressure at a photographed location on a print and a printing apparatus therefor.

It is a sixth object of the invention to provide a camera system comprising a camera capable of recording photographed information, which is capable of recognizing, at a glance, water pressure at a photographed location on a print and a printing apparatus therefor.

It is a seventh object of the invention to provide a camera system comprising a camera capable of recording photographed information, which is capable of recognizing altitude or depth of water by atmospheric pressure or water pressure at a photographed location on a print at a glance and a printing apparatus therefor.

Briefly, a camera according to the invention comprises pressure-information detecting means for detecting pressure information at a location at which a camera body is positioned, magnetic recording means for recording the information detected by the pressure-information detecting means onto a magnetic memory section provided on a film, as environmental information, and recording control means for controlling the photographed-information recording means such that the detected information and a photographed image are recorded corresponding to each other.

These objects and advantages of the present invention will become further apparent from the following detailed explanation.

DETAILED DESCRIPTION OF THE PREFERRED EMBODIMENTS

Various embodiments of the invention will hereunder be described with reference to the accompanying drawings.

In this connection, a camera capable of recording photographic information, according to the invention, has normal photographic function and, in addition thereto, is also capable of photographing within water. Further, the camera capable of recording photographic information, according to the invention, is a camera capable of using a film (hereinafter referred to as "film having a magnetic information memory section") having a magnetic information memory section on a photographic film, as a magnetic-information memory medium.

Figure 1:
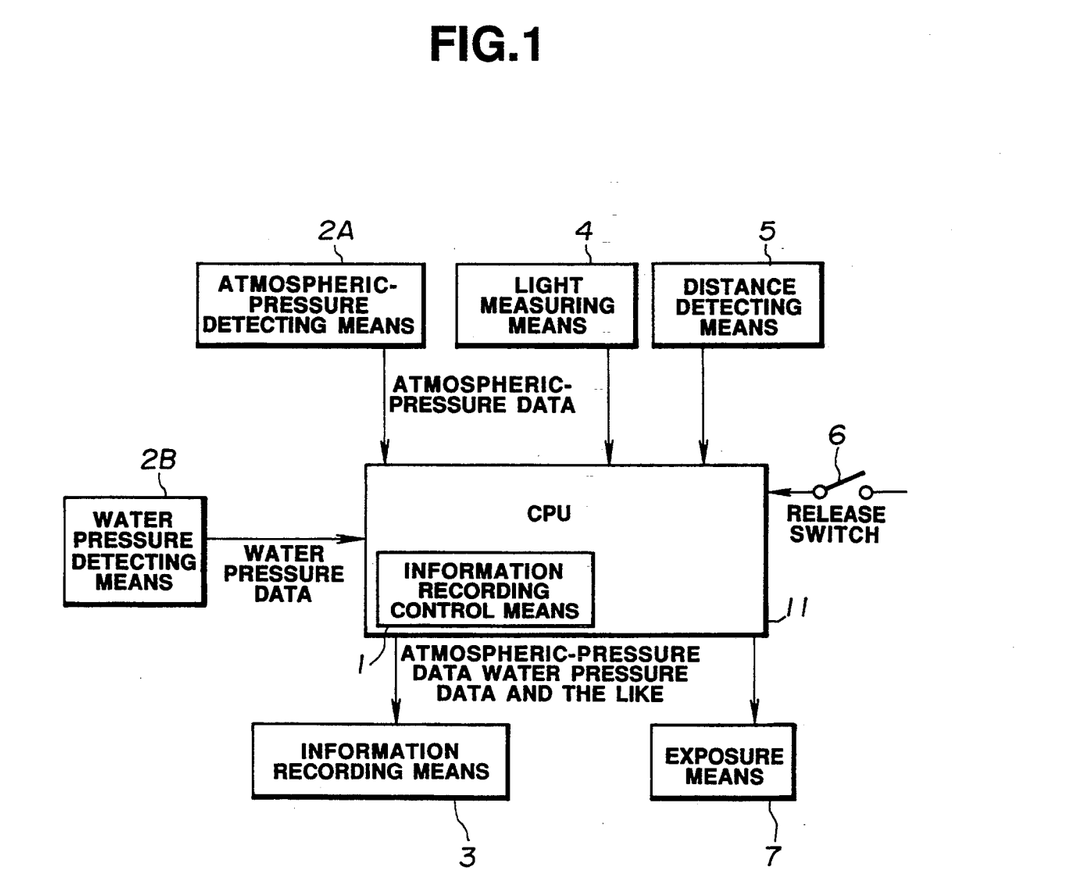
FIG. 1 is a block diagram showing an arrangement of a principal portion of a first embodiment of a camera capable of recording photographic information, according to the invention.

FIG. 1 is a block diagram showing an arrangement of a principal portion in a first embodiment of the camera capable of recording photographic information, according to the invention.

A CPU 11 is a controller for performing or executing various kinds of controls of a camera body. Various kinds of data from atmospheric-pressure detecting means 2A, water-pressure detecting means 2B, light measuring means 4, distance measuring means 5 and the like are inputted to the CPU 11. The CPU 11 serves also as information recording control means 1 and controls information recording means 3 which is connected to the CPU 11, on the basis of atmospheric-pressure data or water-pressure data which are inputted from the atmospheric-pressure detecting means 2A or the water-pressure detecting means 2B.

Further, a release switch 6 and exposure means 7 are connected to the CPU 11. When an ON-signal from the release switch 6 is inputted, an exposure control signal is sent to the exposure means 7. A subject image is exposed onto a film by the exposure means 7 which receives the exposure control signal.

The light measuring means 4 and the distance measuring means 5 are normal or usual light measuring means and normal or usual distance measuring means, respectively, and send information of brightness of the subject or a distance to the subject to the CPU 11. The CPU 11 receives these information to decide stop or restriction diameter, shutter speed, an amount of lens extension and the like.

The atmospheric-pressure detecting means 2A and the water-pressure detecting means 2B are formed by a unit for detecting atmospheric pressure or water pressure at a location at which the camera body is positioned, to send atmospheric-pressure data or water-pressure data to the information recording control means 1 within the CPU 11. Moreover, the information recording means 3 records the atmospheric-pressure information, the water-pressure information or the like such as the atmospheric-pressure data, the water-pressure data or the like processed by the information recording control means 1, onto a magnetic information memory section on the film when the release switch 6 is turned on or immediately thereafter, so as to correspond to a photographic image.

That is, in a case where photographing is performed by the camera arranged in a manner described above, intensity or luminance of the subject which is measured by the light measuring means 4 is first inputted to the information recording control means 1 of the CPU 11 so that restriction of a photographic lens and shutter speed are decided or determined. Furthermore, a distance to the subject which is measured by the distance measuring means 5 is inputted to the CPU 11 so that the amount of extension of the lens is decided. The detected atmospheric-pressure data or the detected water-pressure data are inputted to the CPU 11 by the atmospheric-pressure detecting means 2A and the water-pressure detecting means 2B.

Here, when a release button is depressed so that the release switch 6 is turned on, the exposure control signal is outputted from the CPU 11 to the exposure means 7 so that the subject image is exposed to the film (not shown). Further, when the release button is depressed, or immediately after the release button has been depressed, the measured atmospheric-pressure data, the measured water-pressure data and the like are outputted to the information recording means 3 from the information recording control means 1 within the CPU 11. By the information recording means 3, the atmospheric-pressure information, the water-pressure information or the like is recorded onto the magnetic information memory section on the film correspondingly to the photographed image.

Figure 2:
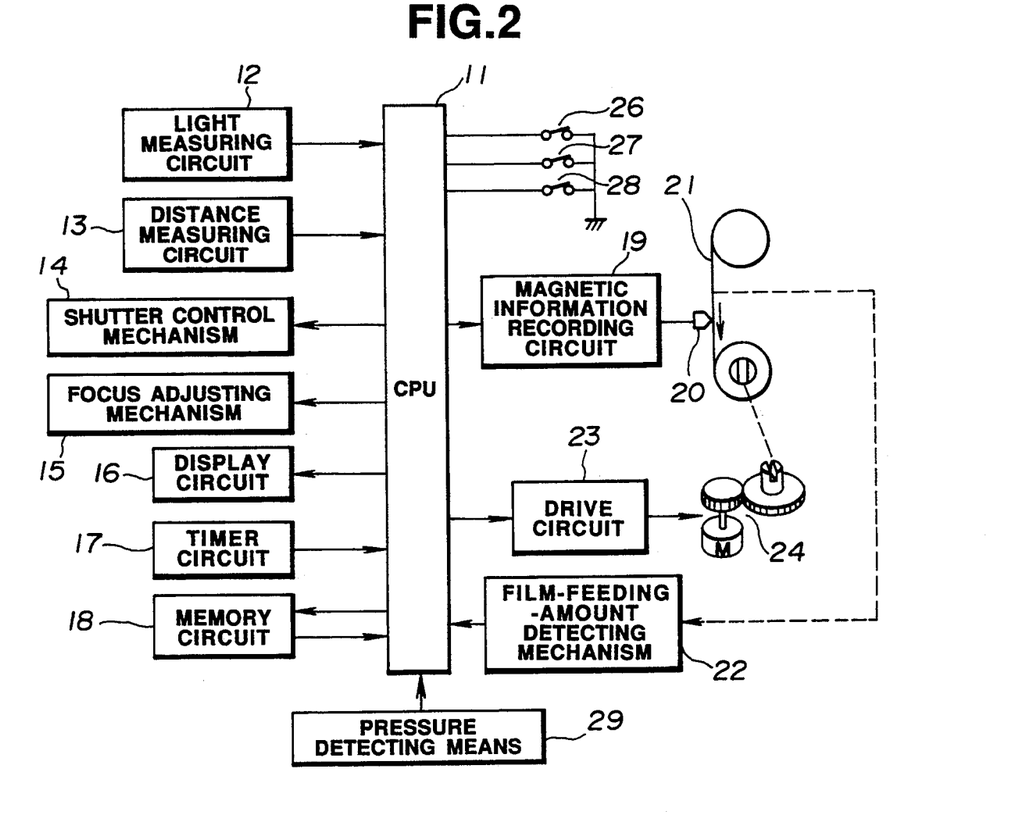
FIG. 2 is a block diagram showing a further detailed arrangement of the camera capable of recording photographic information, according to the first embodiment of the invention.

FIG. 2 is an arrangement view showing a further detailed arrangement of the camera capable of recording photographic information, according to the first embodiment of the invention.

As shown in FIG. 2, the CPU 11 is a controller which governs control of the whole or entire camera including the information recording control means 1, as described above. A light measuring circuit 12, a distance measuring circuit 13, a shutter control mechanism 14 and a focus adjusting mechanism 15, any of which are known well, are connected to the CPU 11. Moreover, a display circuit 16 for displaying various kinds of information such as photographic information, photographed date and the like, a timer circuit 17 for forming date data, and a memory circuit 18 consisting of an EEPROM or the like for temporarily storing magnetic information sent to the information recording means are connected to the CPU 11.

Furthermore, pressure detecting means 29 having the atmospheric-pressure detecting means 2A and the water-pressure detecting means 2B is connected to the CPU 11. In this connection, the reference numerals 26~28 in the figure denote light-measuring/distance-measuring start switch (26), an exposure start switch (27) and a rewinding start switch (28), respectively.

The information recording means 3 has a principal portion thereof which has a magnetic information recording circuit 19 and a magnetic information recording head 20. The magnetic information recording circuit 19 is controlled by the information recording control means 1 within the CPU 11 (see FIG. 1), to drive the magnetic information recording head 20, to thereby record the atmospheric-pressure data or the water-pressure data from the pressure detecting means 29 (the atmospheric-pressure detecting means 2A and the water-pressure detecting means 2B) onto the magnetic information memory section of the film 21 through the magnetic information recording head 20.

Furthermore, a drive circuit 23 for controlling a feeding mechanism 24 for the film 21 and a film-feeding-amount detecting mechanism 22 for detecting a feeding amount of the film 21 are connected to the CPU 11, to control the feeding amount of the film 21.

Figure 3:
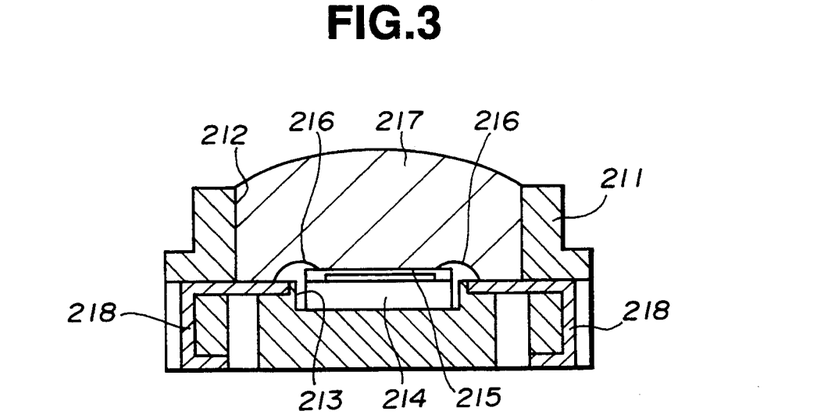
FIG. 3 is a cross-sectional view showing an arrangement of pressure detecting means in the camera capable of recording photographic information, according to the first embodiment of the invention.

The pressure detecting means 29 is formed by, for example, a button-type pressure sensor as shown in FIG. 3. The sensor has a body 211 made of a plastic mold which is provided therein with a pair of recesses 212 and 213. A chip 215 is mounted on a center of the recess 213 through a pedestal 214. The chip 215 is provided with a pressure-sensing element. The pressure-sensing element is electrically connected to a pair of leads 218 through metallic fine wires 216. The leads 218 are extended to a lower surface of the body 211 so as to be capable of taking out an output from the pressure-sensing element to the outside. Moreover, the chip 215 and the metallic fine wires 216 are embedded in resin elastomers 217 which filled the recesses 212 and 213.

In the button-type pressure sensor arranged as described above, when pressure is applied to the pressure sensing element provided on the chip 215 through the resin elastomers 217, a signal in accordance with the pressure is outputted.

Figure 4:
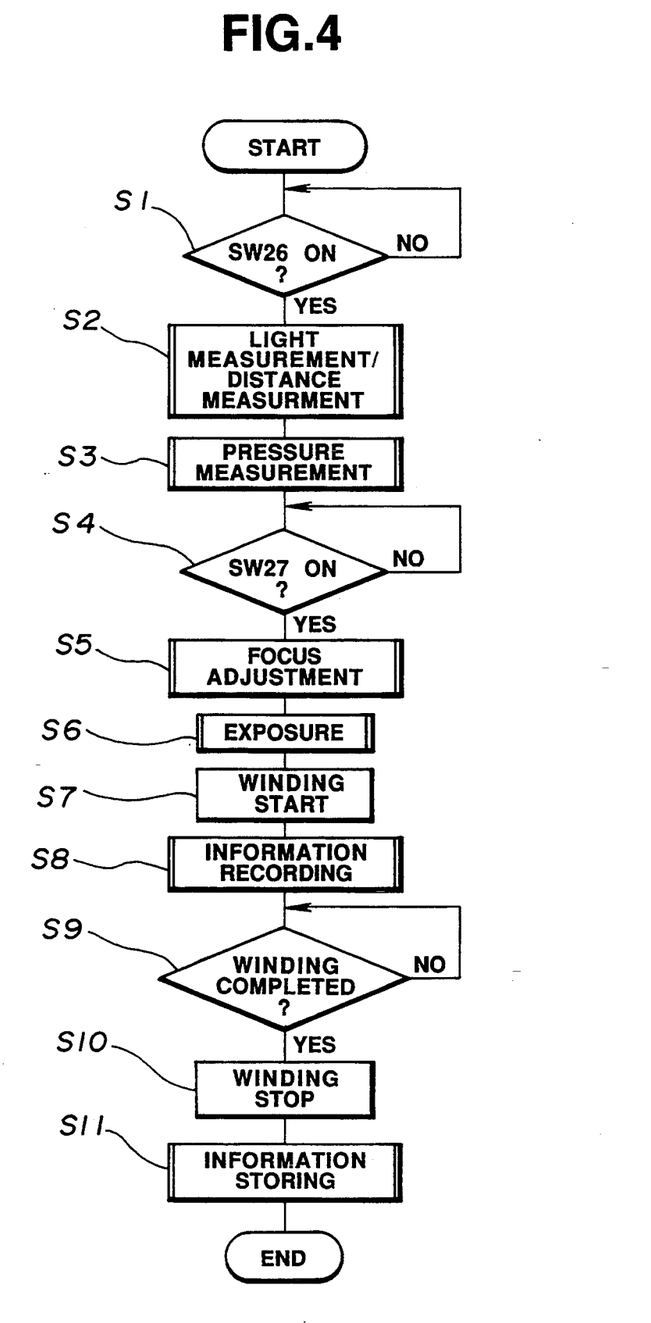
FIG. 4 is a flow chart showing operation of the camera capable of recording photographic information, according to the first embodiment of the invention.

Operation of the camera capable of recording the photographic information, according to the first embodiment of the invention, will next be described with reference to a flow chart illustrated in FIG. 4.

First, when a light-measuring/distance-measuring start switch SW26 is turned on (Step S1), light measurement and distance measurement are performed (Step S2). Further, pressure measurement is performed by the atmospheric-pressure detecting means 2A and the water-pressure detecting means 2B (Step S3). The program then waits until an exposure start switch SW27 is turned on (Step S4). When the exposure start switch SW27 is turned on in Step S4, focal adjustment and exposure are performed (Steps S5 and S6). The film feeding mechanism 24 operates so that winding of the film 21 starts (Step S7).

While the film 21 is wound in Step S7, the CPU 11 transmits data of information to be recorded to the magnetic information recording circuit 19, on the basis of the atmospheric-pressure data or the water-pressure data from the atmospheric-pressure detecting means 2A or the water-pressure detecting means 2B, although the details thereof will be described subsequently. Further, the data of the information are recorded onto the magnetic information memory section on the film 21 by the magnetic information recording head 20 (Step S8).

Subsequently, when the winding operation of the film 21 is completed (Step S9), operation of the film feeding mechanism 24 stops (Step S10). Information the same as that recorded onto the film 21 is stored on the memory circuit 18 (Step S11), and the operation ends or is completed.

A magnetic information recording system in the first embodiment of the invention will next be described with reference to FIGS. 5 and 6.

Figure 5:
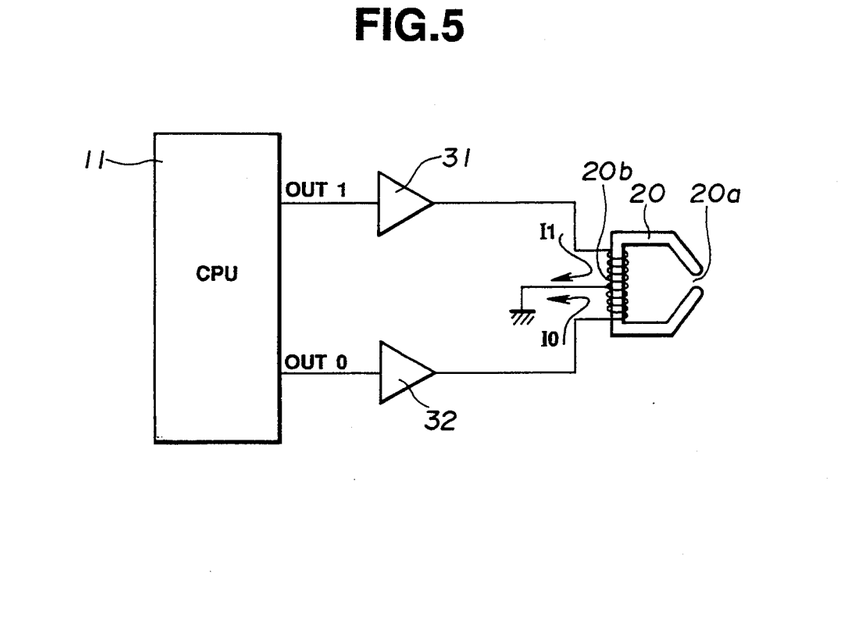
FIG. 5 is a circuit view diagrammatically showing the relationship between a magnetic information recording head and a CPU in the camera capable of recording photographic information, according to the first embodiment of the invention.
Figure 6:
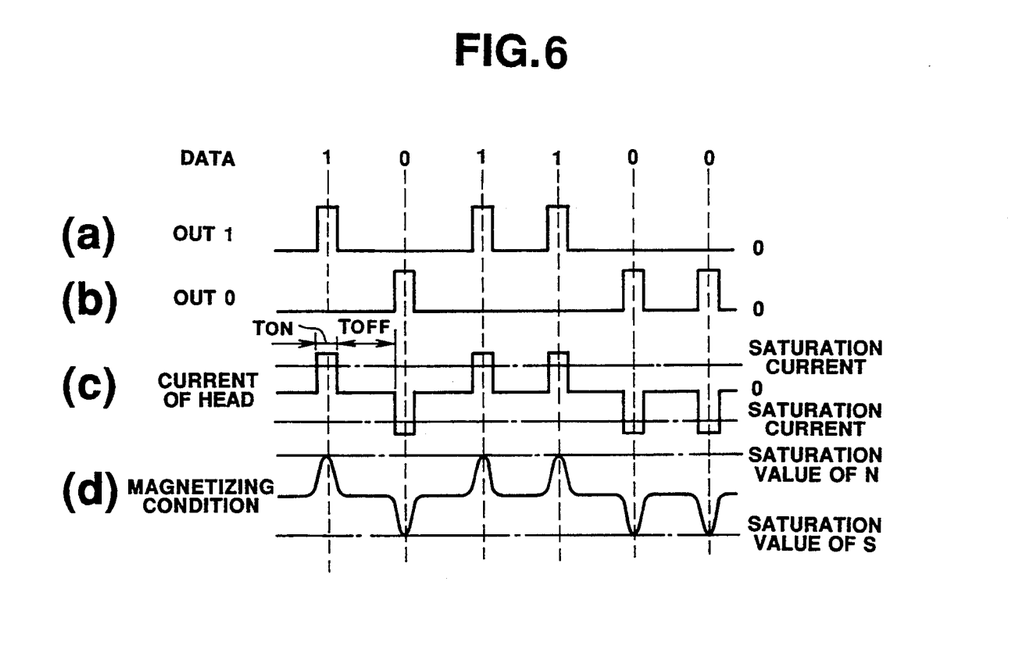
FIG. 6 is a time chart showing current of a magnetic information recording head, a magnetized condition of the head, and an outputting condition of the CPU, upon recording of the magnetic information in the camera capable of recording photographic information, according to the first embodiment of the invention.

In connection with the above, FIG. 5 is a circuit view diagrammatically showing the relationship between the magnetic information recording head 20 and the CPU 11 in the above-described first embodiment, while FIG. 6 is a time chart showing current passing through the magnetic information recording head 20 upon recording of the magnetic information, a magnetized condition of the head and an outputting condition of the CPU 11, respectively.

In this method, conditions of three (3) kinds including a magnetized condition in an N direction, a magnetized condition in an S direction and a non-magnetized condition can be recorded onto the magnetic information memory section serving as a magnetic information memory medium on the film (not shown).

As shown in FIG. 5, an input terminal of the buffer 31 is connected to an output port OUT1 of the CPU 11. The buffer 31 has an output end which is connected to one end of an operating coil of the magnetic information recording head 20. The magnetic information recording head 20 has a gap 20a which is in contact with the magnetic information memory section on the film 21. A buffer 32 has an input end thereof which is connected to an output port OUT0 of the CPU 11. An output end of the buffer 32 is connected to the other end of the operating coil of the magnetic information recording head 20. Furthermore, the operating coil of the magnetic information recording head 20 has a neutral point which is connected to the GND.

In the magnetic information recording circuit arranged in this manner, assuming that the magnetized condition recorded onto the magnetic information memory section on the film 21 in the N direction is "1", and the magnetized condition in the S direction is "0", then, in a case where "1" that is the magnetized condition in the N direction is recorded onto the magnetic information memory section on the film 21, all H (high level) signal is outputted to the buffer 31 from the output port OUT1 of the CPU 11. The magnetic information recording head 20 is biased by the buffer 31 so that current I1 passes through an operating coil 20b of the head 20 through the neutral point to the GND. Thus, magnetic flux is generated on the gap 20a of the magnetic information recording head 20 so that "1" that is the magnetized condition in the N direction is recorded onto the magnetic information memory section on the film 21.

In a case where "0" that is the magnetized condition in the S direction is next recorded onto the magnetic information memory section on the film 21, the H signal is outputted from the output port OUT0 of the CPU 11 to the buffer 32. The magnetic information recording head 20 is biased by the buffer 32 so that current of I0 in a direction opposite to the direction I1 passes through the operating coil of the head 20 through the neutral point to the GND. Accordingly, this causes the magnetic flux in a direction opposite to that of the magnetic flux due to the current of I1 to be generated on the gap 20a of the magnetic information recording head 20 so that "0" that is the magnetized condition in the S direction is recorded onto the magnetic information memory section on the film 21. Moreover, when the H signal is not outputted to both the output ports OUT1 and OUT0 of the CPU 11, the current does not flow through the operating coil 20b of the magnetic information recording head 20 so that the magnetic flux is not generated at the gap 20a of the magnetic information recording head 20. Thus, the magnetized conditions in the N direction and in the S direction are not recorded onto the magnetic information memory section on the film 21.

Although the magnetized conditions of "1" and "0" can be recorded by the output from the output port of a single bit, by the fact that an output port of 2 (two) bits is used, it is possible to express or indicate three (3) conditions including "1" that is the magnetized condition in the N direction, "0" that is the magnetized condition in the S direction, and the neutral condition not wholly magnetized. Accordingly, by the fact that a condition which is not "1" but also "0" is provided to perform judgment or discrimination, it functions or serves as self-running synchronous clock. Thus, a synchronous clock from the outside is dispensed with.

Furthermore, if the magnetized condition will be described on the basis of a timing chart in FIG. 6, an H signal having time duration T-ON is outputted in the form of a rectangular waveform from the CPU 11 to tile output port OUT1 or OUT0 at predetermined timing time duration T. Further, assuming that the time during which the H signal is not outputted either from of the output ports OUT1 and OUT0 is T-OFF, an equation "T=T-ON+T-OFF" holds. Assuming that the H signal outputted to the OUT1 is "1" and a signal outputted to the OUT0 is "0", a data signal sequence [1,0,1,1,0,0] is outputted from the CPU 11 to the output port. When the data from the CPU 11 are "1", the output signal is brought to the H signal with respect to the fact that the output port OUT1 is 0 (low level), as indicated by (a). When the data from the CPU 11 are "0", the output port OUT0 is brought to the H signal as indicated by (b).

in FIG. 6(c), current flowing into the operating coil 20b of the magnetic information recording head 20 from the buffers 31 and 32 is expressed by the signals from the OUT1 and OUT0 such that I1 is current in a positive direction, and I0 is current in a negative direction. Specifically, when OUT1 of the data 1 is the H-level with a 0-level (GND) serving as a reference, the current flowing through the operating coil 20b is brought to a positive waveform in the form of a rectangular waveform exceeding a positive saturated current level, while, when OUT0 of the data 0 is the H-level, the current flowing through the operating coil 20b is brought to a negative waveform in the form of a rectangular waveform, exceeding a negative saturated current level.

Assuming that, as shown in FIG. 6(d), a magnetized condition of the magnetic information memory section of the film 21 is such that the magnetized condition of N is the positive direction, while the magnetized condition of S is the negative direction, then the current is represented by a pulsate waveform reaching a magnetic saturated value of a positive N when the current passing through the operating coil 20b in which the data are "1" is positive, while the current is brought to a pulsate waveform reaching a magnetic saturated value of negative S when the current passing through the operating coil 20b in which the data are "0" is negative, correspondingly to FIG. 6(c).

According to this system, since it is possible to provide a neutral region between the bits, a boundary of the bit data is made clear so that the synchronous clock can be dispensed with.

A second embodiment of the camera capable of recording photographic information, according to the invention will next be described.

The second embodiment is capable of recording not only the atmospheric-pressure information or the water-pressure information, but also altitude information or water-depth information onto a film having a magnetic information memory section. That is, the aforesaid first embodiment records the atmospheric-pressure information or the water-pressure information produced by the atmospheric-pressure detecting means 2A or the water-pressure detecting means 2B, onto the magnetic information memory section on the film 21 (refer to FIG. 2), whereas, in the second embodiment, the atmospheric-pressure information or the water-pressure information produced by the atmospheric-pressure detecting means 2A or the water-pressure detecting means 2B is converted in computation to altitude information or water-depth information, and at least one of the altitude information or the water-depth information thus produced and the atmospheric-pressure information or the water-pressure information is recorded onto the film 21.

The aforementioned computation converting operation is performed within the information recording control means 1 (refer to FIG. 1). Timing at which the operation is performed may be set immediately after pressure measurement in Step S3 is performed, of the flow chart illustrated in FIG. 4. Accordingly, an arrangement is similar to that of the first embodiment.

According to the second embodiment, it is made possible to record the altitude information or the water-depth information onto the magnetic information memory section on the film 21, in addition to the atmospheric-pressure information or the water-pressure information.

Figure 7:
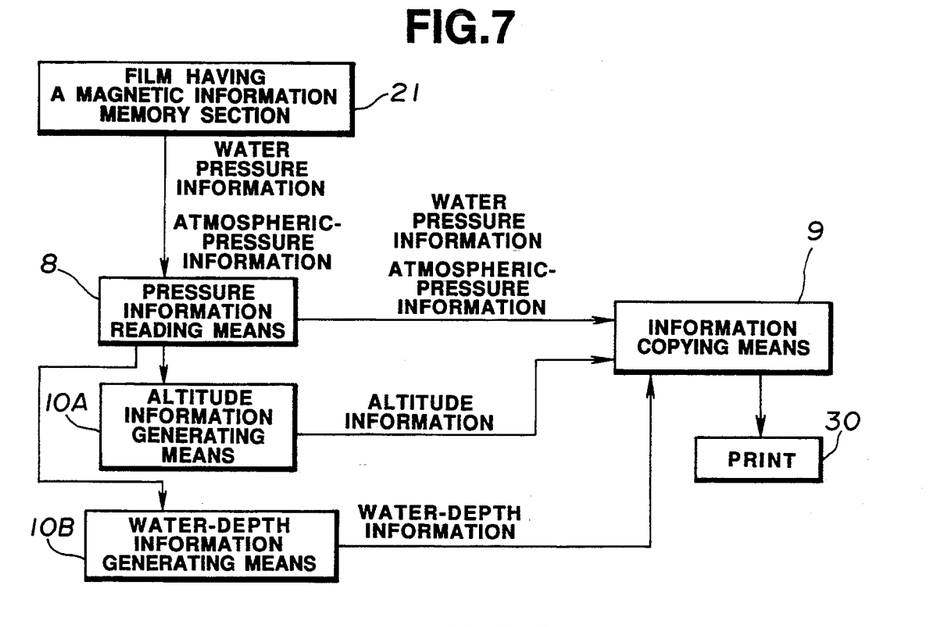
FIG. 7 is a block diagram of a schematic arrangement showing a first embodiment of a printing apparatus according to the invention.

FIG. 7 is a schematic arrangement block diagram showing a first embodiment of a printing apparatus according to the invention.

The embodiment comprises, as a principal portion thereof, pressure-information reading means 8 for reading atmospheric-pressure information or water-pressure information stored in a magnetic information memory section on a film 21 by the information recording means 3 (refer to FIG. 1) in the first or second embodiment of the camera capable of recording photographic information, according to the invention, altitude-information generating means 10A for converting, by computation, atmospheric-pressure information from the pressure-information reading means 8 to generate altitude information, water-depth information generating means 10B for converting, by computation, water-pressure information from the pressure-information reading means 8 to generate water-depth information, and information copying means 9 for copying, onto a print 30, at least one of the atmospheric-pressure information or the water-pressure information from the pressure-information reading means 8, the altitude information from the altitude-information generating means 10A and the water-depth information from the water-depth information generating means 10B.

In the present embodiment, upon printing, the atmospheric-pressure information or the water-pressure information recorded onto the film 21 is first read by the pressure-information reading means 8. Subsequently, in a case where the atmospheric-pressure information or the water-pressure information is copied onto the print 30, the information copying means 9 directly receives the atmospheric-pressure information or the water-pressure information from the pressure-information reading means 8, to copy the atmospheric-pressure information or the water-pressure information onto a desired position on the print 30.

Meanwhile, in a case where the altitude information is copied onto the print 30, the atmospheric-pressure information is once transferred to the altitude-information generating means 10A from the pressure-information reading means 8, and is converted, by computation, to the altitude information in the altitude-information generating means 10A. The information copying means 9 receives the altitude information from the altitude-information generating means 10A, to copy the altitude information to a desired position on the print 30.

Further, in a case where the water-depth information is copied onto the print 30, the water-pressure information is once transferred to the water-depth information generating means 10B from the pressure-information reading means 8, and is converted, by computation, to the water-depth information in the water-depth information generating means 10B. The information copying means 9 receives the water-depth information from the water-depth information generating means 10B, to copy the water-depth information to a desired position on the print 30.

Figure 8:
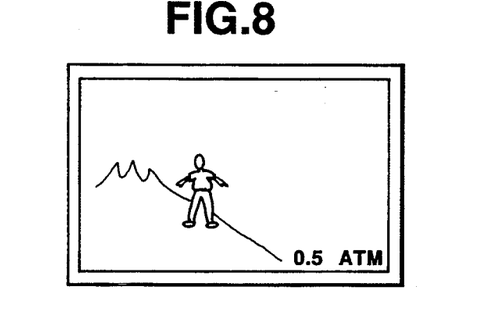
FIG. 8 is a printing example in which atmospheric-pressure information in the above-described embodiment is copied.
Figure 9:
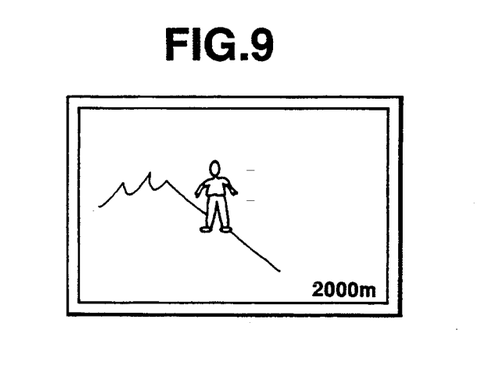
FIG. 9 is a printing example in which altitude information in the above-described embodiment is copied.

FIGS. 8 and 9 show printing examples in which the atmospheric-pressure information or the altitude information is copied.

Figure 10:
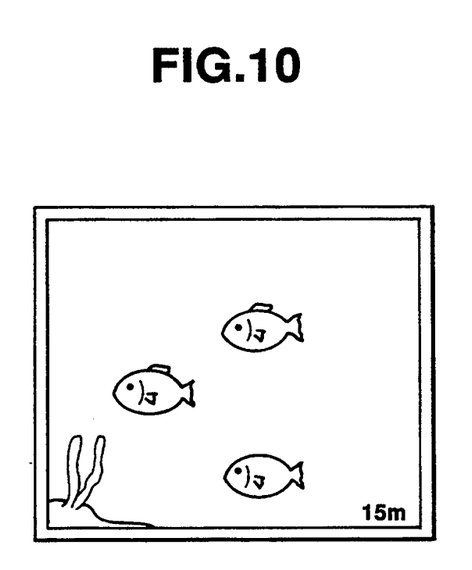
FIG. 10 is a printing example in which water-pressure information in the above-described embodiment is copied.
Figure 11:
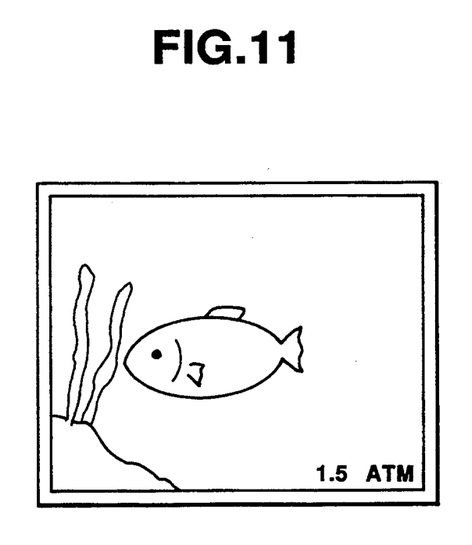
FIG. 11 is a printing example in which water-depth information in the above-described embodiment is copied.

FIGS. 10 and 11 show printing examples in which the water-pressure information or the water-depth information is copied.

In connection with the above, in the aforesaid embodiment, any one of the atmospheric-pressure information, the water-pressure information, the altitude information and the water-depth information is selected and is copied. However, the invention should not be limited to this specific arrangement, and may copy (i.e. print) both of them simultaneously.

Figure 12:
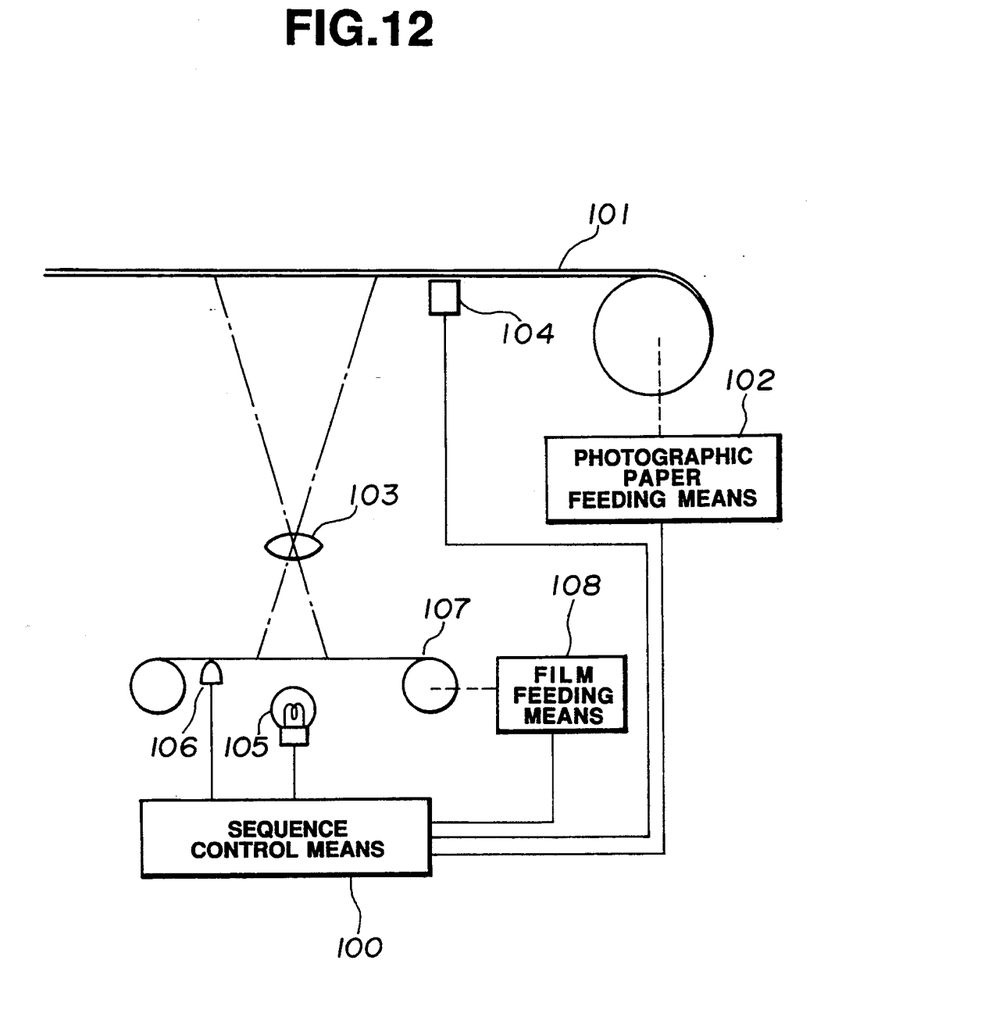
FIG. 12 is a block diagram of a schematic arrangement showing an another embodiment of the printing apparatus according to the invention.

FIG. 12 is a schematic arrangement block diagram showing an another embodiment of the printing apparatus according to the invention.

The embodiment comprises sequence control means 100, photographic-paper feeding means 102, an enlarging lens 103, data copying means 104, a light source 105, a reproducing magnetic head 106, and film feeding means 108. In this connection, the reference character 101 in FIG. 12 denotes a photographic paper, while the reference character 107 denotes a film having a magnetic information memory section.

Figure 13:
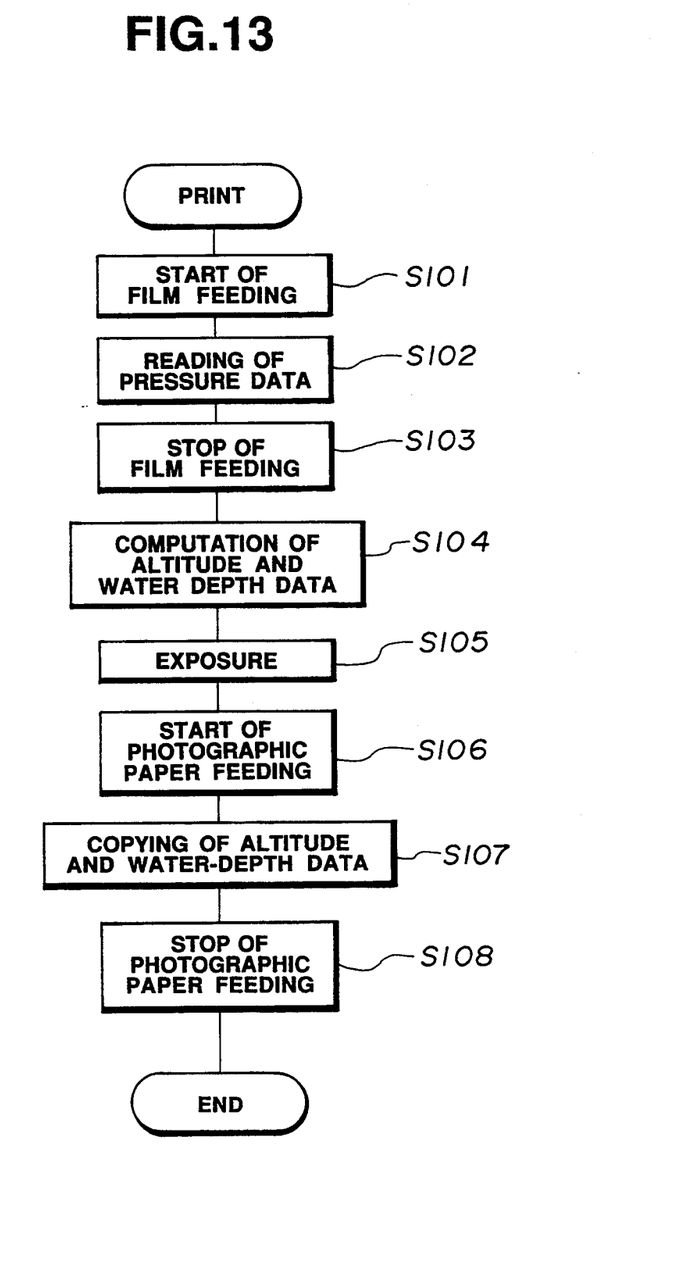
FIG. 13 is a flow chart showing operation of the aforesaid printing apparatus.

Operation of the embodiment will next be described with reference to a flow chart illustrated in FIG. 13.

The film 107 is first fed by the film feeding means 108 (Step 101). Subsequently, during feeding of the film, data of pressure information are read out from a magnetic information memory section of the film 107 through the reproducing magnetic head 106 (Step S102). Subsequently, if feeding corresponding to a single frame is completed, the film feeding stops (Step S103). Subsequently, the pressure data read out are converted to altitude data or water-depth data by the sequence control means 100 (Step S104).

Subsequently, an image on the film 107 is exposed onto the photographic paper 101 by illuminating light from the light source 105 through the lens 103 (Step S105). Subsequently, the photographic paper 101 is fed by the photographic-paper feeding means 102 (Step S106). The altitude data or the water-depth data are copied onto the photographic paper 101 through the data copying means 104 during feeding of the photographic paper 101 (Step S107). If feeding is made by a single frame, feeding of the photographic paper 101 stops (Step S108).

in connection with the above, in a case where, in the present embodiment, the altitude information or the water-depth information is beforehand recorded onto the camera, the read-out data may only be converted to a character code, for example, As described above, according to the invention, there can be provided a camera capable of recording photographic information and a printing apparatus in which a glance makes it possible to recognize atmospheric pressure, water pressure, altitude or water depth at a photographed location, on a print.

In this invention, it is apparent that working modes different in a wide range can be formed on this basis of this invention without departing from the spirit and scope of the invention. This invention is not restricted by any specific embodiment expect being limited by the appended claims.

What is claimed is:

1. A camera capable of recording photographic information, comprising:
    pressure-information detecting means for detecting pressure information at a location where a camera body is positioned;
    magnetic recording means for recording information detected by said pressure-information detecting means onto a magnetic memory section provided on a film, as environmental information; and
    recording control means for controlling said photographic-information recording means such that said detected information and a photographic image are recorded corresponding to each other on said film.

2. A camera capable of recording photographic information, according to claim 1, wherein said pressure-information detecting means comprises atmospheric-pressure information detecting means for detecting atmospheric-pressure information.

3. A camera capable of recording photographic information, according to claim 1, wherein said pressure-information detecting means comprises water-pressure information detecting means for detecting water-pressure information detecting means for detecting water-pressure information.

4. A camera capable of recording photographic information, according to claim 1,
    wherein said pressure-information detecting means comprises information detecting means for detecting atmospheric-pressure information or water-pressure information; and
    wherein said magnetic recording means has a magnetic head for recording said detected atmospheric-pressure information, as altitude data, and the water-pressure information, as water-depth information, onto said magnetic memory section on said film.

5. A camera capable of recording photographic information, according to claim 4, further including memory means for storing therein the detected atmospheric-pressure information or the detected water-pressure information.

6. An underwater camera capable of recording photographic information, comprising:

pressure-information detecting means for detecting water-pressure information at a location where a camera body is positioned;

magnetic recording means for recording information detected by said pressure-information detecting means onto a magnetic memory section which is provided on a film, as environmental information; and recording control means for controlling said photographic-information recording means such that said detected information and a photographic image are recorded corresponding to each other on said film.

7. An underwater camera capable of recording photographic information onto a magnetic memory section provided on a photographic film, comprising:

pressure-information detecting means for detecting water-pressure information at a location where a camera body is positioned:

photographic-information memory means for storing information detected by said pressure-information detecting means in a memory section provided on said camera body, as photographic information;

magnetic means for recording information detected by said pressure-information detecting means onto said magnetic memory section, as environmental information; and control means for controlling said detected information and a photographed image such that said detected information and said photographed image correspond to each other when at least one of recording onto said magnetic memory section and storing to said photographic-information memory means is performed.

8. A camera capable of recording photographic information onto a magnetic memory section provided on a photographic film, comprising:

atmospheric-pressure information detecting means for detecting atmospheric-pressure information at a location where a camera body is positioned;

information recording means for recording atmospheric-pressure information detected by said atmospheric-pressure information detecting means onto said magnetic memory section, as environmental information; and recording control means for controlling said atmospheric-pressure information and a photographed image such that said atmospheric-pressure information and said photographed image correspond to each other when recorded onto said magnetic memory section.

9. A camera capable of recording photographic information onto a magnetic memory section provided on a photographic film, comprising:

atmospheric-pressure information detecting means for detecting atmospheric-pressure information at a location where a camera body is positioned;

altitude-information converting means for converting atmospheric-pressure information detected by said atmospheric-pressure information detecting means, to altitude information;

information recording means for recording at least one of the atmospheric-pressure information detected by said atmospheric-pressure information detecting means and the converted altitude information onto a magnetic memory section; and recording control means for controlling said information recording means such that said information and a photographic image correspond to each other when at least one of said atmospheric-pressure information recording and said altitude information recording is stored in said magnetic memory section.

10. A camera capable of recording photographic information onto a magnetic memory section provided on a photographic film, comprising:

atmospheric-pressure information detecting means for detecting atmospheric-pressure information at a location where a camera body is positioned;

altitude-information converting means for converting atmospheric-pressure information detected by said atmospheric-pressure information detecting means, to altitude information;

information recording means for recording at least one of atmospheric-pressure information detected by said atmospheric-pressure information detecting means and converted altitude information onto the magnetic memory section;

photographic-information memory means provided on said camera body for storing therein information which is the same as the information recorded by said information recording means; and control means for controlling said information recording means such that said information and a photographic image correspond to each other when at least one of said atmospheric-pressure information recording and said altitude information recording is stored in said magnetic memory section, and for storing the recorded information in said photographic-information memory means.

11. A camera capable of recording photographic information onto a magnetic memory section provided on a photographic film, according to claim 10, further including:

reproducing means for reproducing magnetic information recorded onto said magnetic memory section upon rewinding; and memory confirming means for determining if said reproduced magnetic information is correctly stored.

12. A camera system including a camera for recording information and a printing apparatus which uses said information to perform printing, including:

said information recording camera comprising;

pressure-information detecting means for detecting pressure information at a location where a camera body is positioned;

magnetic head means for recording information detected by said pressure-information detecting means onto a magnetic film as photographic information; and recording control means for controlling said magnetic head means such that said detected information and a photographic image are recorded corresponding to each other, said printing apparatus comprising;

pressure-information reading means for reading pressure information recorded onto said magnetic film; and information copying means for copying a visually observable representation of the pressure information received from said reading means onto a print surface during printing.

13. A camera system including a camera for recording information and a printing apparatus which uses said information to perform printing, including:

said information recording camera comprising;
pressure-information detecting means for detecting one of water-pressure information and atmospheric-pressure information at a location where a camera body is positioned;
photographic-information recording means for recording information detected by said pressure-information detecting means onto a magnetic film as photographic information; and
recording control means for controlling said photographic-information recording means such that said detected information and a photographic image are recorded corresponding to each other;
said printing apparatus comprising:
pressure-information reading means for reading pressure information recorded by said photographic-information recording means;
information computing means for computing one of water-depth information and altitude information, on the basis of pressure information received from said reading means; and
information copying means for copying a visually observable representation of at least one of said received pressure information and said computed water-depth information and said computed altitude information, onto a print surface during printing.

14. A camera system capable of recording a status upon photographing onto a photographic print, comprising:
a camera capable of loading a film having a magnetic recording section, including;
pressure detecting means for detecting environmental pressure of the camera to output pressure data;
memory means for storing therein said pressure data in keeping with photographic operation; and
magnetic recording means for reading pressure data stored in said memory means to record the pressure data generated by said detecting means onto said magnetic recording section during feeding of said film,
a photographic printer for printing an image on said film, including:
reproducing means for reading out pressure data recorded onto the magnetic recording section on said film;
information converting means for converting said pressure data to copying information; and
copying means for copying a visually observable representation of said copying information onto said photographic print in keeping with a printing operation.

15. A camera system capable of recording a status upon photographing onto a photographic print, according to claim 14, wherein the pressure data recorded onto said film by said camera are atmospheric pressure, and information copied onto said photographic print by said photographic printer is altitude information obtained during photographing.

16. A camera system capable of recording a status upon photographing onto a photographic print, according to claim 14, wherein pressure data recorded onto said film by said camera are water pressure, and information copied onto said photographic print by said photographic printer is water depth upon photographing.

17. A camera comprising:
a body onto which a film having a magnetic memory section is loaded;
a manual operating element for outputting a first signal in response to initial operation, and for outputting a second signal in accordance with operation subsequent to said initial operation;
pressure detecting means for detecting environmental pressure of said camera to output pressure information;
memory means for storing therein said pressure information in response to said first signal
exposure means for performing an exposure operation in response to said second signal;
film feeding means for performing a single-frame winding operation of said film after completion of said exposure operation; and
magnetic recording means for reading out data stored in said memory means to record the read-out data onto said magnetic memory section during the single-frame winding operation performed by said film feeding means.

18. A camera according to claim 17, wherein said pressure information is atmospheric pressure.

19. A camera according to claim 17, wherein said pressure information is water pressure.

20. A camera on which a film having a magnetic memory section is capable of being loaded, for recording data regarding photographic environment, onto said magnetic memory section during feeding of said film, said camera comprising:
pressure detecting means for detecting pressure in a neighborhood adjacent to said camera; and
computing means for computing data based on detecting results of said pressure detecting means, as photographic environmental data to be recorded onto said magnetic recording section of said film.

21. A camera according to claim 17, wherein data computed by said computing means are data relating to atmospheric pressure.

22. A camera according to claim 17, wherein data computed by said computing means are data relating to water pressure.

23. A camera according to claim 17, wherein said computing means includes means for converting detected results of said pressure detecting means to one of altitude and water depth upon photographing.

24. A photographic printer for printing an image exposed onto a film having a magnetic memory section, onto a photographic print paper, comprising:
means for guiding said film to a printing position;
read-out means for reading out pressure data recorded upon photographing, from said magnetic memory section corresponding to a frame which performs printing, while said film is guided to said printing position, said read-out means including a reproducing magnetic head;
means for converting said pressure data to data indicating one of altitude upon photographing and water depth upon photographing; and
means for copying a visually observable representation of said converted data onto said photographic print paper during a printing operation.

25. A photographic printer for printing an image exposed onto a film having a magnetic memory section, onto a photographic print paper, comprising:
read-out means for reading out data recorded upon photographing, from said magnetic memory section corresponding to a frame which performs printing; and
means for copying a visually observable representation of one of altitude and water depth upon photographing, onto said photographic print paper during said image printing operation on the basis of said data.

* * * * *